Jan. 6, 1953      C. F. KRAMER      2,624,614
VEHICLE BODY CONSTRUCTION
Filed July 5, 1951
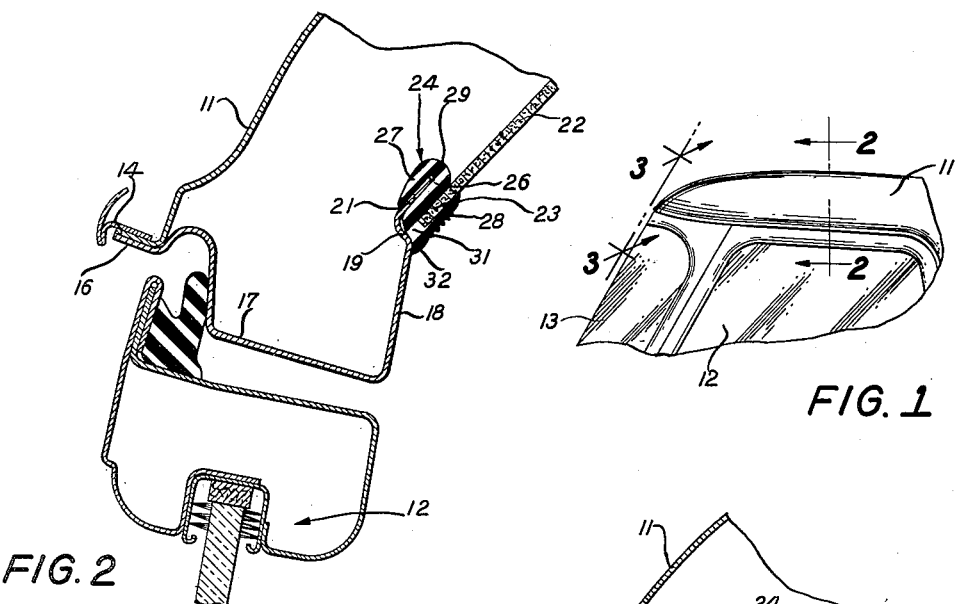
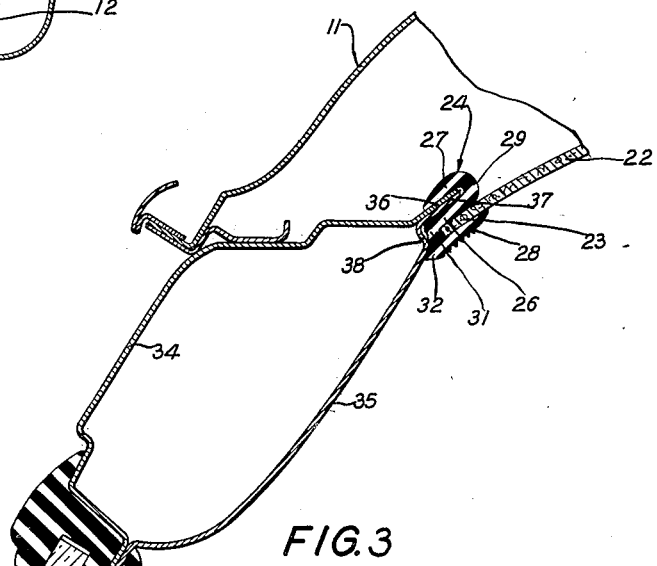
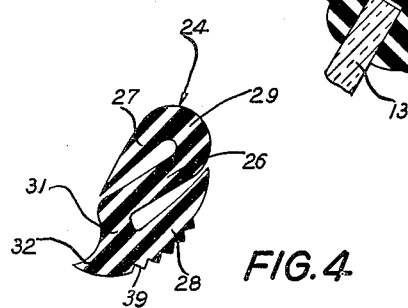
C. F. KRAMER
INVENTOR.
BY E. C. McRae
J. R. Faulkner
L. H. Oster
ATTORNEYS Patented Jan. 6, 1953

2,624,614

UNITED STATES PATENT OFFICE 2,624,614

VEHICLE BODY CONSTRUCTION

Clarence F. Kramer, Birmingham, Mich., assignor to Ford Motor Company, Dearborn, Mich., a corporation of Delaware Application July 5, 1951, Serial No. 235,218

4 Claims. (Cl. 296—137)

This invention relates generally to a motor vehicle body construction and has particular reference to a body construction in which the interior roof trim panel of a motor vehicle body is supported upon the adjacent body structure by a retainer strip.

In trucks and other commercial vehicles it is customary to trim the interior of the roof of the body with a relatively inexpensive and durable fiberboard, and it is an object of the present invention to provide inexpensive and easily installed means for mounting a trim panel of this type upon the adjacent body structure. A further object is to provide a construction of this type which incorporates an elongated retainer strip of resilient material, such as rubber, having oppositely facing grooves formed therein to receive the edge portion of the trim panel and a parallel flange of the roof rail or other adjacent body structure. The retainer strip may be assembled without special tools and eliminates the necessity for other fastening or attaching means between the trim panel and the body. In addition it forms a decorative strip for the interior of the body between the roof trim panel and the exposed portion of the roof rail.

Another object is to provide a construction of the type mentioned above in which the resilient retainer strip is especially designed in such manner as to be somewhat distorted when assembled to the roof trim panel and the adjacent roof rail so as to cause the retainer strip to tightly embrace the trim panel and roof rail.

Other objects and advantages of this invention will be made more apparent when considered in connection with the drawings, wherein:

Figure 1 is a fragmentary side elevational view of a portion of a motor vehicle body.

Figure 2 is an enlarged transverse cross-sectional view taken on the plane indicated by the line 2—2 of Figure 1.

Figure 3 is an enlarged longitudinal cross-sectional view taken on the plane indicated by the line 3—3 of Figure 1.

Figure 4 is an enlarged cross-sectional view through the retainer strip shown in Figures 2 and 3 but showing the strip in its free position.

Referring now to Figure 1 of the drawing, the reference character 11 indicates the roof panel of the motor vehicle body of a truck or similar vehicle, while the reference character 12 indicates the front door of the vehicle and 13 the windshield thereof.

With reference now to Figure 2, it will be seen that the roof panel 11 is formed with an outwardly extending marginal flange 14 spot welded to an adjacent flange 16 of the roof rail 17. At its inner edge the roof rail 17 is bent upwardly to form an exposed section 18 continuing into a short outwardly and upwardly inclined intermediate portion 19 and terminating in a marginal flange 21 extending upwardly and inwardly from the intermediate portion 19. The marginal flange 21 is thus offset outwardly from the exposed section 18 of the roof rail by an amount equal to the width of the intermediate portion 19.

Reference character 22 indicates the roof trim panel which may be formed of a semi-rigid fiberboard. The lower edge portion 23 of the trim panel 22 extends parallel to the marginal flange 21 of the roof rail in overlapping relationship and is spaced inwardly a predetermined distance therefrom. The edge portion 23 of the trim panel terminates above the intermediate portion 19 of the roof rail and generally forms a continuation of the exposed portion 18 of the roof rail.

The roof trim panel is held in the position described above by means of a retainer strip 24 formed of extruded rubber or other resilient material. The retainer strip 24 is generally S-shaped and has an intermediate portion 26 integrally joined to upper and lower flanges 27 and 28 respectively by short interconnecting portions 29 and 31 respectively. The arrangement is such that a pair of parallel grooves are formed in the retainer strip spaced from each other and opening toward opposite edges of the strip. In the free position of the strip, as shown in Figure 4, the grooves are partially collapsed so that the flanges 27 and 28 must be spread in order to be assembled to the vehicle.

As shown in Figure 2, the upper flange 27 embraces the adjacent marginal flange 21 of the roof rail and the lower flange 28 embraces the adjacent edge portion 23 of the roof trim panel 22, with the intermediate portion 26 of the strip being positioned between the roof rail flange 21 and the trim panel edge portion 23.

The connecting portion 31 between the intermediate portion 26 and the lower flange 28 of the retainer strip is located adjacent the intermediate portion 19 of the roof rail. It will be noted that the interconnecting portion 31 of the retainer strip is provided at its lower end with a lip 32 projecting forwardly and downwardly and arranged to embrace the corner formed between the portions 18 and 19 of the roof rail. It will be apparent that the projecting lip 32 must be distorted from the free position shown in Figure 4 to the position shown in Figure 2 when assembled to the vehicle. This distortion results in placing the lower flange 28 of the strip under compression and causing the lower flange to tightly engage the edge portion 23 of the roof trim panel to firmly hold it in place.

Figure 3 is similar to Figure 2 but shows the construction adjacent the forward portion of the vehicle body in which the roof rail is formed as a box-shaped windshield header having inner and outer panels 34 and 35 respectively. The inner and outer panels 34 and 35 terminate at their upper ends in adjacent marginal flanges 36 and 37 which are suitably joined together as by spot welding. As in the side roof rail construction shown in Figure 2, the marginal flange 37 is offset outwardly from the inner panel 35 by means of an intermediate portion 38. The rubber retainer strip 24 is assembled in the same fashion except that the upper flange 27 embraces the double thickness flange of the windshield header formed by the marginal flanges 36 and 37 of the inner and outer panels thereof while in the side construction shown in Figure 2 it embraces the single section roof rail.

In the construction shown the lower face of the lower flange 28 of the retainer strip is grooved as at 39 to enhance the appearance thereof.

It will be apparent that the retainer strip described above can be readily assembled to the roof rail or windshield header without special tools simply by slipping the strip over the marginal flange thereof. It is then a simple matter to snap the roof trim panel into the groove formed between the intermediate section 26 and the lower flange 28 of the trim strip in which position it is firmly held in place in the manner more fully described above. It is, of course, also a simple matter to remove the roof trim panel if necessary for maintenance purposes.

This construction is inexpensive to manufacture and also to install and provides a sturdy construction properly supporting the roof trim panel and at the same time forming a decorative molding between the panel and the roof rail or windshield header.

It will be understood that the invention is not to be limited to the exact construction shown and described, but that various changes and modifications may be made without departing from the spirit and scope of the invention, as defined in the appended claims.

What is claimed is:

1. In combination with a motor vehicle roof rail inner panel having an outwardly offset inwardly and upwardly inclined marginal flange and an interior trim panel generally forming a continuation of said roof rail inner panel and having an edge portion overlapping and extending generally parallel to said roof rail marginal flange but in the opposite direction and spaced inwardly therefrom, an elongated retainer strip of elastic material having a pair of relatively deep laterally spaced grooves formed therein extending parallel to each other and opening at opposite edges of said strip, one of said grooves being adapted to receive said roof rail marginal flange and the other the edge portion of said trim panel to support the latter.

2. The structure defined by claim 1 which is further characterized in that said strip is formed with said grooves partially collapsed in the free position of the strip to enable the latter to tightly embrace the roof rail flange and the trim panel, said strip also being provided with a downwardly extending lip engageable with said roof rail inner panel adjacent the offset therein.

3. In combination with a motor vehicle body construction having an inner body panel comprising an upwardly extending exposed portion continuing into a short outwardly extending intermediate portion and terminating in an upwardly and inwardly extending marginal flange and an interior semi-rigid trim panel forming the interior ceiling of said motor vehicle body and having its edge portion arranged in inwardly spaced overlapping relationship to said marginal flange and generally in alignment with the exposed portion of said body panel, an elongated retainer strip of resilient material of generally S-shape, said strip having an intermediate portion integrally joined to parallel but oppositely extending upper and lower flanges by return bent interconnecting portions, the intermediate portion of said strip being positioned between the marginal flange of said body panel and the edge portion of said trim panel with the upper flange of the strip embracing the marginal flange of the body panel and the lower flange of the strip embracing the edge portion of the trim panel.

4. The structure defined by claim 3 which is further characterized in that the interconnecting portion joining the intermediate portion and the lower flange of the retainer strip is seated upon the short outwardly extending intermediate portion of the inner body panel and has a downwardly and forwardly projecting lip embracing the corner between the exposed and intermediate portions of the body panel, said lip being deformed and under compression when engaged with the body panel and holding the inner flange of the retainer strip tightly against the trim panel.

CLARENCE F. KRAMER.

REFERENCES CITED

The following references are of record in the file of this patent:

UNITED STATES PATENTS

| Number | Name | Date |
|---|---|---|
| 2,093,614 | Lynch | Sept. 21, 1937 |
| 2,118,563 | Mackay | May 24, 1938 |
| 2,247,457 | Widman | July 1, 1941 |
| 2,276,530 | Weaver | Mar. 17, 1942 |
| 2,497,276 | Scott et al. | Feb. 14, 1950 |
| 2,563,221 | Doty et al. | Aug. 7, 1951 |